US008303514B2

(12) United States Patent
Laurence et al.

(10) Patent No.: US 8,303,514 B2
(45) Date of Patent: Nov. 6, 2012

(54) MEANS AND APPARATUS FOR RAPID, ACCURATE, NON-CONTACTING MEASUREMENT OF THE CORE TEMPERATURE OF ANIMALS AND HUMANS

(75) Inventors: Laird W. Laurence, Fredericksburg, TX (US); Jack C. Laurence, San Antonio, TX (US); James Derwin King, San Antonio, TX (US); Michael R. Williams, Fredericksburg, TX (US); James C. Lyman, Pipe Creek, TX (US)

(73) Assignee: Vital Accuracy Partners, Fredericksburg, TX (US)

( * ) Notice: Subject to any disclaimer, the term of this patent is extended or adjusted under 35 U.S.C. 154(b) by 776 days.

(21) Appl. No.: 11/971,088

(22) Filed: Jan. 8, 2008

(65) Prior Publication Data
US 2008/0194983 A1 Aug. 14, 2008

Related U.S. Application Data

(63) Continuation-in-part of application No. 10/350,880, filed on Jan. 24, 2003, now Pat. No. 7,336,987.

(60) Provisional application No. 60/351,969, filed on Jan. 25, 2002.

(51) Int. Cl.
*A61B 5/01* (2006.01)
(52) U.S. Cl. ...................................................... 600/549
(58) Field of Classification Search .................. 600/549
See application file for complete search history.

(56) References Cited

U.S. PATENT DOCUMENTS

| 3,299,274 | A | * | 1/1967 | Hoelter | 356/217 |
|---|---|---|---|---|---|
| 3,491,596 | A | | 1/1970 | Dean | 73/355 |
| 4,797,840 | A | * | 1/1989 | Fraden | 702/104 |
| 5,110,200 | A | * | 5/1992 | Snook | 351/212 |
| 5,115,815 | A | | 5/1992 | Hansen | 600/474 |
| 5,811,811 | A | * | 9/1998 | Naya | 250/339.15 |
| 5,813,982 | A | | 9/1998 | Baratta | 600/398 |
| 6,312,393 | B1 | | 11/2001 | Abreu | 600/558 |
| 2001/0044588 | A1 | * | 11/2001 | Mault | 600/549 |
| 2002/0033453 | A1 | * | 3/2002 | Sauer et al. | 250/338.1 |
| 2003/0142723 | A1 | * | 7/2003 | Laurence et al. | 374/121 |
| 2004/0240517 | A1 | * | 12/2004 | Howard | 374/130 |
| 2005/0267344 | A1 | * | 12/2005 | Woods et al. | 600/316 |
| 2006/0017883 | A1 | * | 1/2006 | Dai et al. | 351/205 |

FOREIGN PATENT DOCUMENTS

| CN | 2304113 Y | 1/1999 |
|---|---|---|
| CN | 1245951 A | 3/2000 |

OTHER PUBLICATIONS

Polivka's, "Microwave Radiometry and Applications," International Journal of Infrared and Millimeter Waves, vol. 16, No. 9 (XP 000534670) pp. 1593-1672, Sep. 16, 1995.
International Search Report PCT/US03/02411, Mailed May 12, 2003.
Written Opinion from PCT/US03/02411, Mailed Jan. 22, 2004.

* cited by examiner

*Primary Examiner* — Max Hindenburg
*Assistant Examiner* — Michael C Stout
(74) *Attorney, Agent, or Firm* — Chowdhury & Georgakis PC

(57) ABSTRACT

A method and apparatus for measuring the core temperature of an animal or human. Thermal black body emissions from the eyeball are detected, at one or more wavelengths selected on the basis of various factors, including the ability of that wavelength to reach the interior of the eyeball. An illumination marker shines a spot of light on the eyeball, such that the spot corresponds to the area from which emissions are being detected.

27 Claims, 6 Drawing Sheets

MEANS AND APPARATUS FOR RAPID, ACCURATE, NON-CONTACTING MEASUREMENT OF THE CORE TEMPERATURE OF ANIMALS AND HUMANS

RELATED PATENT APPLICATION

This application is a continuation-in-part of U.S. application Ser. No. 10/350,880, filed Jan. 24, 2003 now U.S. Pat. No. 7,336,987, which claims priority to U.S. Provisional Application Ser. No. 60/351,969, filed Jan. 25, 2002, the contents of which are incorporated herein by reference in their entirety.

TECHNICAL FIELD OF THE INVENTION

This invention relates to temperature sensing devices, and more particularly to a device for measuring human or animal core temperature from the black body emissions of the eye.

BACKGROUND OF THE INVENTION

A need exists for rapid and accurate measurement of the core temperature of humans as well as animals, particularly, but not limited to, domestic food animals such as cattle, sheep, and goats, as well as horses. Core temperature, the internal body temperature, or more precisely the temperature of the blood as it flows in or near the pulmonary artery near the heart, has been difficult to measure accurately without physical contact with the sensitive interior of the body. Such measurements require a surgically invasive insertion of a temperature probe and this is rarely justified except in critical surgery. In practice, core temperature is not really measured but is approximated with rectal, oral and ear thermometers and others. A better, more accurate and more rapid measurement of actual core temperature is needed for use at home, in the offices, in animal barns, hospitals, clinics and many other places and situations.

In the United States' cattle industry, annual mortality of cattle due to disease is estimated to be in the hundreds of millions of dollars. A reliable method of determining the health of a cow or the presence of disease is by assessing the body temperature of the animal. In the case of infections, environmental factors, or toxins, a cow's temperature will elevate. These elevations are diagnostic to veterinarians in the diagnosis of disease and disease conditions in cattle. In the day-to-day production of cattle, the evaluation of the presence of increased body temperature or fever is under utilized due to time constraints and the need to physically restrain the animal. This under utilization of temperature evaluation delays the diagnosis of disease and therefore increases the use of antibiotics and loss of animals.

Traditionally, to obtain temperature measurements, clinical thermometers have been inserted rectally or orally and must remain in position for periods of several minutes to obtain a stable reading. This usually requires restraint of the animal, which is time consuming and labor intensive. Typically, the body temperature of cattle is measured with a clinical mercury Fahrenheit thermometer or with a digital thermometer. A mercury thermometer has a scale ranging from 94 F. to 110 F. and each degree is divided into ⅕ths. The thermometer requires shaking the mercury column into the bulb end. The thermometer is then lubricated or moistened and manually inserted its full length into the rectum. It remains in the rectum for a minimum of 3 minutes to obtain an accurate reading. As most animals object to this procedure, the animal must be physically restrained during this time.

In recent years, temperature sensors of low thermal mass, such as miniature thermocouples or thermistors, have been used with an electronic digital readout to make the more rapid digital thermometers. However, these devices still require oral or rectal insertion and restraint of the animal but the time for accurate measurement is only one minute.

Other approaches to animal temperature measurement are based on sensing the thermal emission energy, the so called black body emission. This energy is emitted as a wide band electromagnetic spectrum by all heated bodies and has a wavelength distribution and intensity in proportion to temperature. This emitted energy is detected by use of a non-contact microwave, millimeter (mm) wave, or infrared (IR) sensors. Thermal emission measurement is rapid, but the accuracy by which the thermal emission is related to temperature is affected by two factors, in addition to instrumental errors, if any. The first factor is how accurately an emitting surface that is accessible for measurement relates to the core temperature. This frequently poses a problem with animals and humans in that skin may not be a true representation of the internal temperature. This is particularly a problem with Infrared (IR), where the depth within a body from which the emission is detected is very shallow and is essentially proportional to the outer temperature of the skin. The second factor, surface emissivity, also affects the amount of thermal emission from a body at a given temperature. This causes temperature measurements, based on thermal emissions, to vary depending on the color and the physical properties of the materials being measured. To attempt to overcome this source of error, some IR thermal emission thermometers use a probe inserted into the ear. However, surface emissivity in the ear can vary due to the amounts and types of debris and these can limit the accuracy. In another variation, an insert is placed in the ear of the animals to provide a constant emissivity target for the IR sensor. The insert must be in the ear for a sufficient time to reach thermal equilibrium prior to measurement, which is undesirable from cost and time considerations.

The possibility of measuring the core temperature of cattle by remote (hands-off) sensing has been of great interest over the past 30 years or more. Previous approaches have been based on (1) passive detection of the magnitude of the IR or microwave energy that is emitted in proportion to the temperature and wavelength (in accordance with Planck's law) from most materials including human or animal hide or ear (interior); (2) the use of implants and/or tags which use contact type thermal sensors (thermistors, thermocouples, etc.) and usually a wireless means of reading out the data on demand; and (3) the use of ingested temperature sensing capsules which contain a temperature sensor and a radio frequency (VHF or UHF) transmitter or transponder to communicate the temperature data from the interior of the animal to an outside read out unit. None of these previous devices or approaches is completely satisfactory due to cost, poor accuracy, practical application limitations, or other reasons.

Existing passive IR emission thermometers are of limited accuracy (+/−1 degree or worse). These methods are based on sensing surface (skin or hide) temperature and do not have sufficient accuracy nor repeatable for direct measurement of animal body temperature. Skin temperature is not always an accurate indication of the internal temperature of the animal. Also, the emissivity of hair-covered skin is variable and, with IR, will not provide accurate skin temperature nor core temperature indications.

DETAILED DESCRIPTION OF THE INVENTION

The invention described herein provides rapid, accurate non-contact measurement of electromagnetic thermal emission and relates such measurements to the core temperature of the animal or person. It overcomes the limitations of previous thermal emission thermometers by non-contact sensing of thermal emissions only from the eye of the subject. The eye provides a target with many desirable properties for such measurements. It is readily accessible, generally very clean, has a high emissivity, is quite uniform from one person or animal of the same species to another, and is continuously bathed with fresh body fluids, internally and externally that maintain the eye near the core temperature. The wavelength of eye emissions that are sensed for such temperature measurements may be of microwave, millimeter wave, or specific spectral bands of IR wavelengths. It may also be a combination of more than one wavelength or spectral bands within these ranges, optimized to be most suitable for the intended application.

Criteria for optimization of the detected wavelength include: (1) suitability for non-contact sensing of the emission from a spot the size of the eye, or a selected portion thereof, while minimizing the sensitivity to emissions from regions outside the said spot; (2) maximizing the depth into the eye from which emissions are detected to insure the highest correlation with core temperature, while maintaining an acceptable instrument sensitivity measurement error; (3) freedom from effects of the environment, natural and manmade, on the measurement; and (4) measurement time for sufficient accuracy.

The method uses electromagnetic (black body) emission from the eye of the animal or person to accurately and rapidly assess temperature. This hands-off method is effective and efficient in the early detection of disease. This facilitates the rapid use of proper treatment regiments and reduces the overuse of antibiotics and thus the antibiotic residue in meat and milk supplies.

Figure 1:
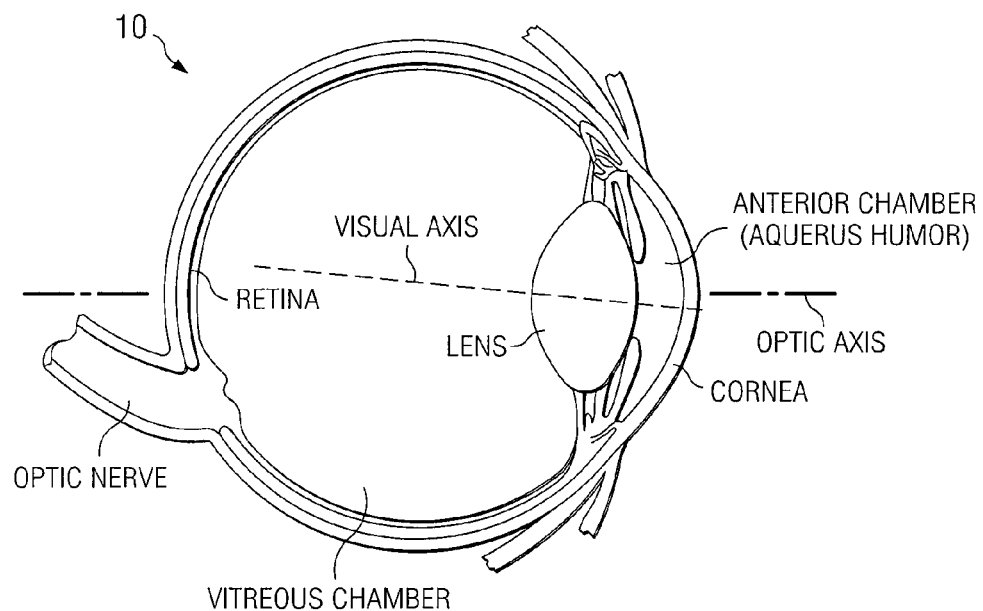
FIG. 1 is a cross sectional view of the eye of a mammal, such as a cow.

In the example of this description, the method obtains accurate core temperature indications by using the measured thermal electromagnetic emissions, from the eye of the person or animal, that are within one or more spectral bands centered at specific wavelengths and of specific bandwidths. The eye is accessible from outside the animal and has the possibility of providing an accurate core temperature indication—especially if emission from within the eyeball is utilized. FIG. 1 is a cross sectional view of the eye of a mammal, such as a human or animal. The eyeball is continuously bathed by body fluids, and has continuous blood flow within the exterior wall and in the eye socket and eyelid regions. These tend to keep the eye temperature very near the body core temperature and to keep the external surface relatively clean.

It is known from laser safety guidelines that only visible and near-infrared (400-1400 nm) wavelengths of electromagnetic radiation (light) can readily penetrate the aqueous, cornea, iris, lens, and vitreous and be focused on the retina at the back interior of the eyeball. Similarly, emissions from these interior regions will pass through the front of the eye and may be detectable externally by use of a suitable sensor. Mid-infrared (1400-3000 nm) and far infrared (3000 nm to 1 mm) are absorbed in the front surface of the eye, though some mid-infrared (sometimes called short wave IR) of (1.4-2.5 microns) penetrates deeper through the cornea and through the sclera. Far infrared thermometers primarily detect emission from the exposed outer surface of the eye—due to high absorption of such wavelengths of infrared emissions coming from the interior by vitreous, the sclera and the near surface layers of the eyeball. While these emissions could be near the core temperature, the eye surface emissions will be much stronger. In addition, the eye surface may not always be sufficiently insulated from the effects of environmental temperatures, wind, rain, etc., to consistently provide an accurate correlation with core temperature. Emissions from the lens, vitreous, and retina, which are deeper within the eyeball, meet the criteria for more accurate correlation with the core temperature. Sensing of the specific bands of emissions from the interior regions of the eye provides a useful basis for obtaining accurate core temperature with a non-contacting sensor.

Figure 2:
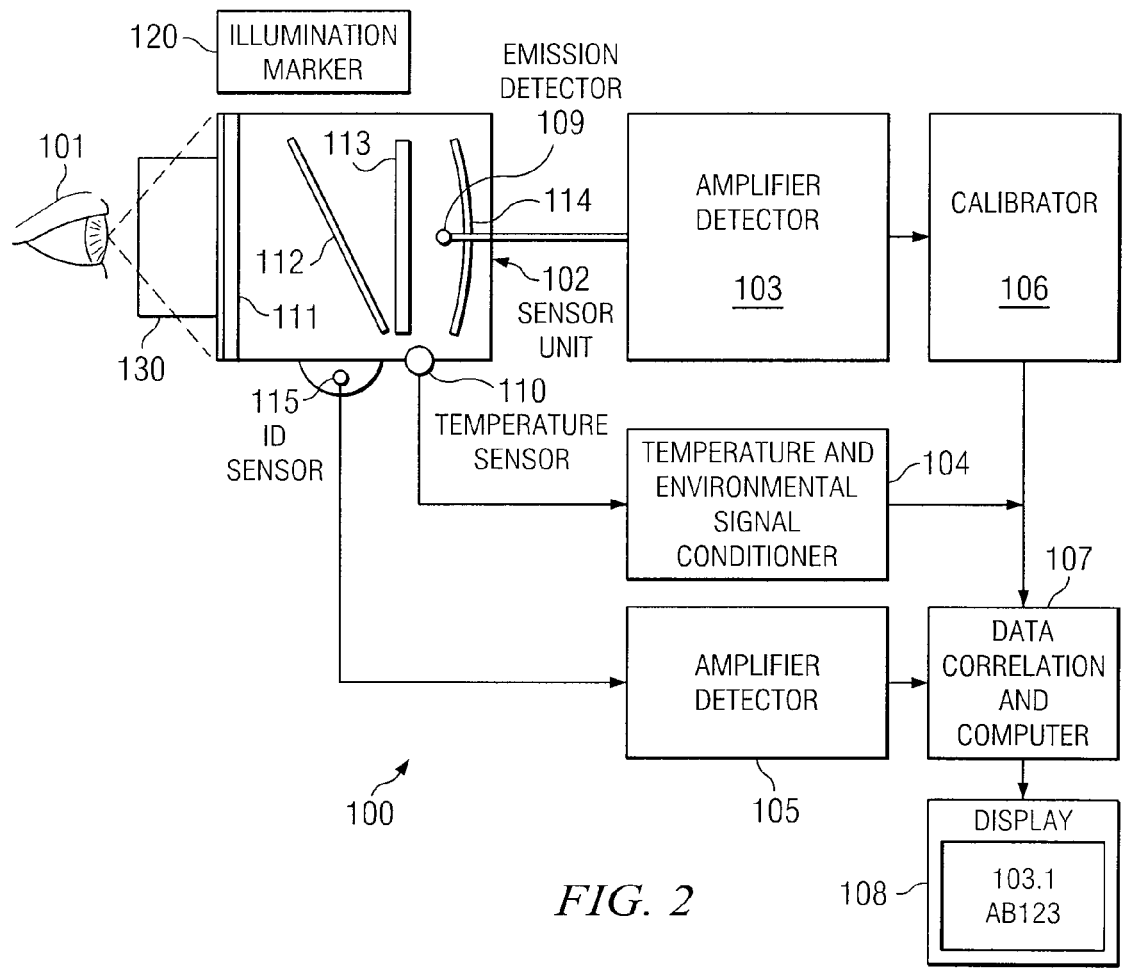
FIG. 2 is a block diagram of a first embodiment of the invention.

FIG. 2 illustrates a core temperature measurement device 100 in accordance with the invention. A sensor unit 102 contains the detector 109 and auxiliary apparatus needed to sense the thermal (Planck) emission of selected wavelengths from the eye 101 of an animal or human. The sensor unit 102 also contains various optics elements, such as lenses, a mirror, and filters for focusing the emission of interest on the detector 109 and filtering the emission to allow only wavelengths of interest to reach the detector 109. It may also contain a means to reduce the temperature of the detector 109 to increase the sensitivity of said detector and it may also cool optical lens and filters to reduce thermal emissions from all components which would be seen by the detector 109. In the example of FIG. 2, sensor unit 102 contains an IR filter 111, a half mirror 112, a spectral filter 113, and a parabolic reflector 114. A light shield 130, for example, a rubber eyepiece, may be used to minimize non-related thermal emissions during the measurement and to set the separation distance from the eye to the sensor unit.

In the example of FIG. 2, sensor unit 102 detects IR emission of the spectral wavelength bands of interest. The optical components provide a sensitive aperture for detection of eye emissions passing through this defined region of the eye surface. The area of this aperture may be near the area of the eye or a selected portion thereof. The sensor unit 102 provides such an aperture at a distance of a fraction of an inch to a few inches or more from the front of the unit.

The sensor unit 102 also contains auxiliary sensors for sensing the temperatures of the assembly and other environmental parameters needed to compensate for their effects on the core temperature measurement. In the example of FIG. 2, a temperature sensor 110 obtains a temperature measurement. An identification (ID) sensor 115 senses data needed to identify the particular animal or person being measured. For example, ID sensor 115 could be used to read a bar coded tag on the animal, it could be a radio frequency Identifier (RFID) or it could sense unique optical characteristics of the eye. The optional filter 111 allows a broad wavelength band of emission of interest to pass to the detector 109 but rejects emissions outside this range. The broad wavelength bands of interest include those used for eye temperature measurement and those used for animal identification and may also include those used for producing a visible spot or direct optical viewing for properly aiming the sensor 102 toward the eye to be measured. It also acts as a dust and water seal to protect the interior of 102 from the environment. Filter 113 passes wavelengths needed for the temperature sensing. Means to use multiple filters of different wavelength bands are also a part of the invention.

Illumination marker 120 provides a visual indication of the region of the eye 101 that is being examined for core temperature measurement. In other words, marker 120 provides a spot of visible light on the eye that corresponds to the aperture area of sensor unit 102. For example, marker 120 might provide a spot of light on the eye when the detector unit 102 is properly aimed toward the eye. The marker 120 permits the operator to stand away from the animal and know that sensor unit 102 is aimed towards the desired eye region. The spot of light serves the additional function of attracting the animal's attention and thereby facilitating measurement.

The output signal from the emissions detector 109 goes to the amplifier-detector 103 which boosts the amplitude of the signal and detects the amplitude of the emissions from the eye. The detected signal is normalized and calibrated in terms of the temperature of the emitter by the calibrator 106. The eye emission data from measurements of live humans and animals is initially calibrated to a precise surgically invasive core temperature thermometer such as the Swan-Ganz Catheter or Pulmonary Artery Catheter. During such initial tests the animal (cow or other) is restrained under veterinarian care to minimize movement and allow access for an adequate series of measurements to be made. Vaccines, such as pasturella, provide a harmless means for temporarily raising the temperature of test cattle by up to about 5 degrees above the normal range of 100-103 F. to provide a range of core temperatures for as needed for calibration.

Initial calibration data for human core temperature will be obtained using a surgically invasive thermistor probe such as the Swan-Ganz for comparison with the eye thermometer measurements under medically suitable conditions as available.

The output of the temperature sensor 110 (and any other environmental sensors) is connected to the temperature and environmental signal conditioner and control unit 104, where the signal is amplified, normalized and used to provide correction data needed to compensate for and improve the accuracy of relating the emissions data to the core temperature of the animal or human. For example, changes in temperature of the sensor and associated components can affect the detector sensitivity and "zero signal" output level as well as the magnitude of non-related thermal emissions that reach the detector. Corrections and compensations that are needed are performed by the data correlator and computer 107. If desired, conditioner and control unit 104 may include means for maintaining sensor unit 102 at a constant temperature. It may also be cooled to improve sensitivity by use of a thermoelectric cooler or cryogenic fluid in an insulated enclosure about the detector.

Identification sensor 115, through amplifier-detector 105 also provides data to the data correlator and computer 107, which provides a visual, numerical readout of the core temperature, identification data, time, date, environmental temperature, and other pertinent information on display 108. The core temperature is computed from the amplitude of the eye emissions, of a selected wavelength and spectral bandwidth, corrected for effects, if any, of environmental and instrument temperature, distance from the eye to the sensor assembly 102, region of the eye that is measured and the type of animal as well as for instrumentation variables of amplifier gain, detector gain and sensitivity, and pre-detection bandwidth. This readout data is also stored in the computer 107 for later recovery or for transfer to an external data storage facility for long time retention. Display 108 may also display other information, such as an animal's rectal temperature, breed and other identifiers.

Figure 3:
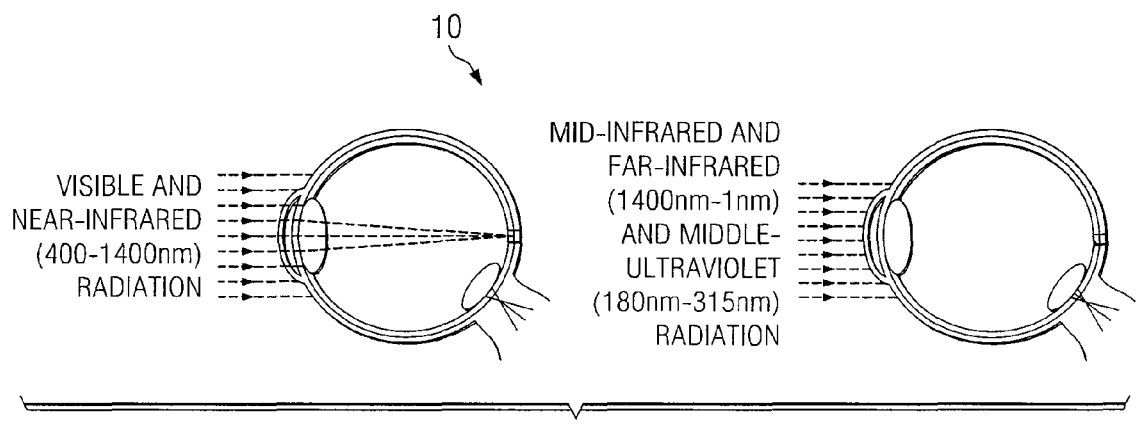
FIG. 3 illustrates the relative depth of emission of various wavelengths from the eye.

FIG. 3 illustrates the infrared and visible light transmission properties of the various regions of an eye 10. As illustrated, the visible and near-infrared (400-1400 nm) wavelengths of light are transmitted with small attenuation through the cornea, aqueous, iris, lens and vitreous and focused on the retina at the back of the eyeball. Longer wavelength light in the mid-infrared and far-infrared (wavelength range of 1400 nm to 1.0 mm) are, except for a few discrete bands of wavelengths, greatly attenuated in the cornea but some mid-IR wavelengths (near 1600-1800 nm and 2150-2350 nm), may penetrate an appreciable distance into the eye interior. Similarly, thermal emissions will be transmitted from the retina-vitreous region through the lens, cornea, aqueous, and iris to the outside in corresponding wavelengths of low attenuation. Mid-IR at wavelengths 1000-2400 nm may also be transmitted through the sclera which covers the entire eyeball except for that covered by the cornea. Thus, far-infrared emissions from the eye will be primarily from the surface, whereas the weaker mid- and near-infrared emissions, especially of certain bands of wavelengths, will penetrate the front part of the eye and be more representative of the interior eye temperature. Millimeter waves and longer wavelengths of emission will be representative of temperatures deeper within the eye interior than those of the far infrared wavelengths. IR detectors operating at far infrared wavelengths may be used to sense emissions from the tear duct area of the eye that correlate with core temperature.

To obtain electromagnetic emission data from deeper into the eye, the use of shorter IR (0.8 to 3 micron) wavelength ranges is advantageous. The wavelength range that is sensed is set by the type of detector 109 and by the use of filters, such as filter 111, ahead of the detector to restrict the range of emission wavelengths that fall upon the detector. For wavelengths greater than about 1.5 microns a broadband thermopile detector or some photodiodes, such as cooled extended range indium arsenide or extended range Indium Gallium Arsenide photodiodes, cooled or at ambient temperature, provide good sensitivity and are commonly used either with or without IR filters to restrict the bandwidth of the detected emission. For shorter wavelengths, other photodiodes (germanium, silicon, gallium arsenide, and several others) with various dopants or photomultiplier type sensors provide good sensitivity, either cooled or not cooled. IR bandpass filters are used to restrict the wavelength range of the emissions that is detected. Otherwise the emissions from several regions of the eye would be detected simultaneously. The surface emissions, representing the surface temperature of the eye, can be much larger than those from deeper into the eyeball. Unless corrected for wavelength (or otherwise) these surface emissions will cause errors in measuring the desired (internal) emissions that, in most cases, will be most representative of the core temperature. A far-IR detector will respond entirely to the surface temperature, which in general, is much more susceptible to environmental effects than are the internal emissions. Conversely, the low attenuation in the eyeball at visual and near-IR wavelengths would be most suitable for transmitting emissions from deep into the eye back to the retina region. This is desirable since the retina region is best isolated from environmental effects and the temperature is best correlated with core temperature. Unfortunately, there is a problem with the intensity of the Planck emission at these short (visual and near-infrared) wavelengths. In practice the emission from a black body at live animal temperatures (300-310 K) is so weak that it is undetectable at visual and at the shorter near IR wavelengths even with the best detectors. Even at 1000 nm, the emission at these temperatures is still so weak that it is not rapidly detectable. The instrumentation question then becomes, for a small, hand held thermal emissions detector are there any IR wavelengths where internal eyeball temperatures are accurately measurable (to 0.1 K) in an acceptably short time (few seconds), from a stand off distance (range) of a few inches? The answer is yes if an extended (wavelength) range indium gallium arsenide detector, or an equivalent, is used at wavelengths in the 1600-2400 nm range, particularly in either or both of the two bands, 1600-1800 and 2150-2350 nm that provide the lowest attenuation for internal eye emissions as was previously mentioned. A preferred embodiment of 102 of the invention uses a said type extended range InGaAs detector with optical filters that will pass emissions of nominal wavelengths 1600-1800 or 2150-2350 nm, or both, along with collecting and focusing optics that will create an IR sensing region (of a size equivalent to the cornea or larger) when the detector 102 is at a selected distance, for example 0.5 inch to several inches or more from the eye to be measured.

Another detail of the invention addresses additional means that are utilized to further reduce the effects of emissions coming from different depths in the eye or from extraneous, non-related sources and to thereby improve the measurement accuracy. The desired thermal emissions that best correlate with the core temperature come from the interior of the eye. However, other (unwanted) thermal emissions will be detected from the surface and near-surface of the eye. These may be at the same temperature as the desired interior emissions, at a higher temperature or at a lower temperature. In any case the surface and near-surface emissions can be expected to vary a small amount with changing environmental temperature, wind and rain and thereby cause measurement errors. The interior emissions will only be of appreciable intensity at the wavelengths where the eye attenuation is minimal (these are the same wavelengths as the optimum detector filter(s) while the surface and near-surface emissions have a much wider spectrum with intensity drastically increasing at longer wavelengths. By comparing the total emission detected through the said narrow band filter with the total emission detected with a wider band filter, or with a filter of different center wavelength, the component due to internal emission will not change (except for different attenuations in the band filter) while the detected surface emissions will increase significantly with a broad filter. By knowing the spectral band pass characteristics of the broad filter and of the detector, the emissions from the eye surface and spurious sources are determined and a correction factor is derived for the interior eye temperature measurement.

Figure 4:
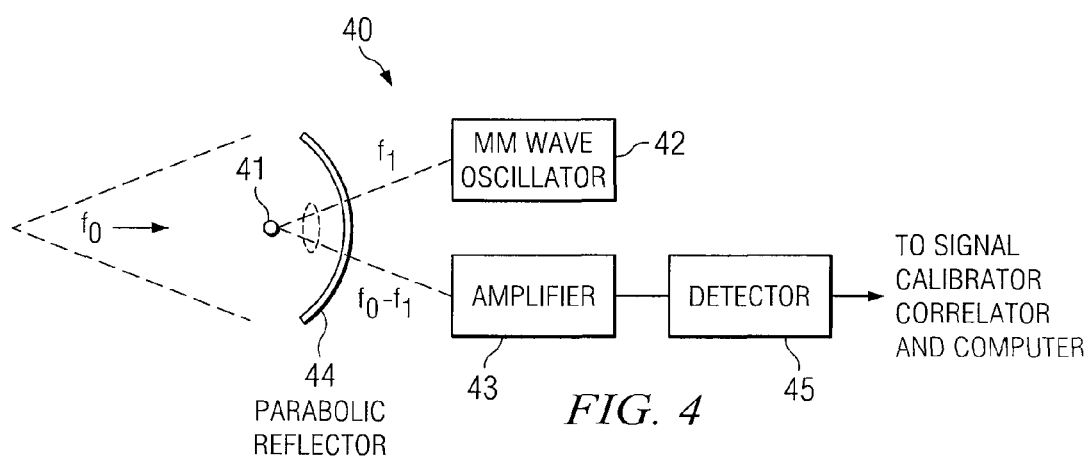
FIG. 4 illustrates an alternative embodiment of the invention for microwave and mm wave operation.

FIG. 4 illustrates a microwave and millimeter wavelength detector 40, which is an alternative embodiment to the sensor unit 102 of FIG. 2. Another possibility, within the scope of the invention, for obtaining eyeball interior temperature data is to detect emission in the longer wavelength (compared to IR) microwave and millimeter (mm) range. Sensitive detectors, using normal radio frequency superhetrodyne (mixer-oscillator) techniques, are available at modest costs for the nominal 3 mm (80-100 GHz) range as a result of commercial and government interest in this part of the spectrum. In practice, these detectors are more sensitive than thermopiles and can readily detect the lower level blackbody emissions at these longer wavelengths to accuracies of 0.1 F. degree or better, depending on the observation (signal integration) time and the pre-detection bandwidth. While antenna size, and the attendant near-field, far-field limitation, can pose a problem in restricting the detection area to that of the eye, this can be overcome by making the maximum distance, from antenna to the eye (to be measured), several inches and by use of well known antenna approaches to providing a narrow beam. Even a 1-inch diameter parabolic dish antenna, for example, could have a far field beam width on the order of 10 degrees and a focused near field that would encompass the animal or human's cornea area.

An antenna-detector-mixer device 41 may be implemented as a small integrated circuit. The antenna portion picks up the eye emissions at selected wavelengths, the mixer portion mixes the emission signal with the signal from oscillator 52, and the detector portion converts the emission signal to a lower frequency for amplification by amplifier 53. The antenna size and the oscillator frequency are functions of the desired emission wavelengths to be detected.

For all wavelengths (IR, millimeter, and micrometer), the detection of eyeball emissions at two or more wavelength bands offers the opportunity to minimize the effects of environmental temperature and background emission levels for a given temperature measurement. For example, signals at a first wavelength can be compared to signals from a second wavelength. For this implementation, the sensor unit 102 of FIG. 2 (or the antenna-mixer-detector 41 of FIG. 4) could be modified to accommodate more than one emissions signal path or detector. This could be accomplished by the use of multiple filters and detectors. Alternatively, a single detector could be used, and a wheel or some other electromagnetic or electromechanical or magneto-optic device used to provide a succession of filters to that detector.

Figure 5:
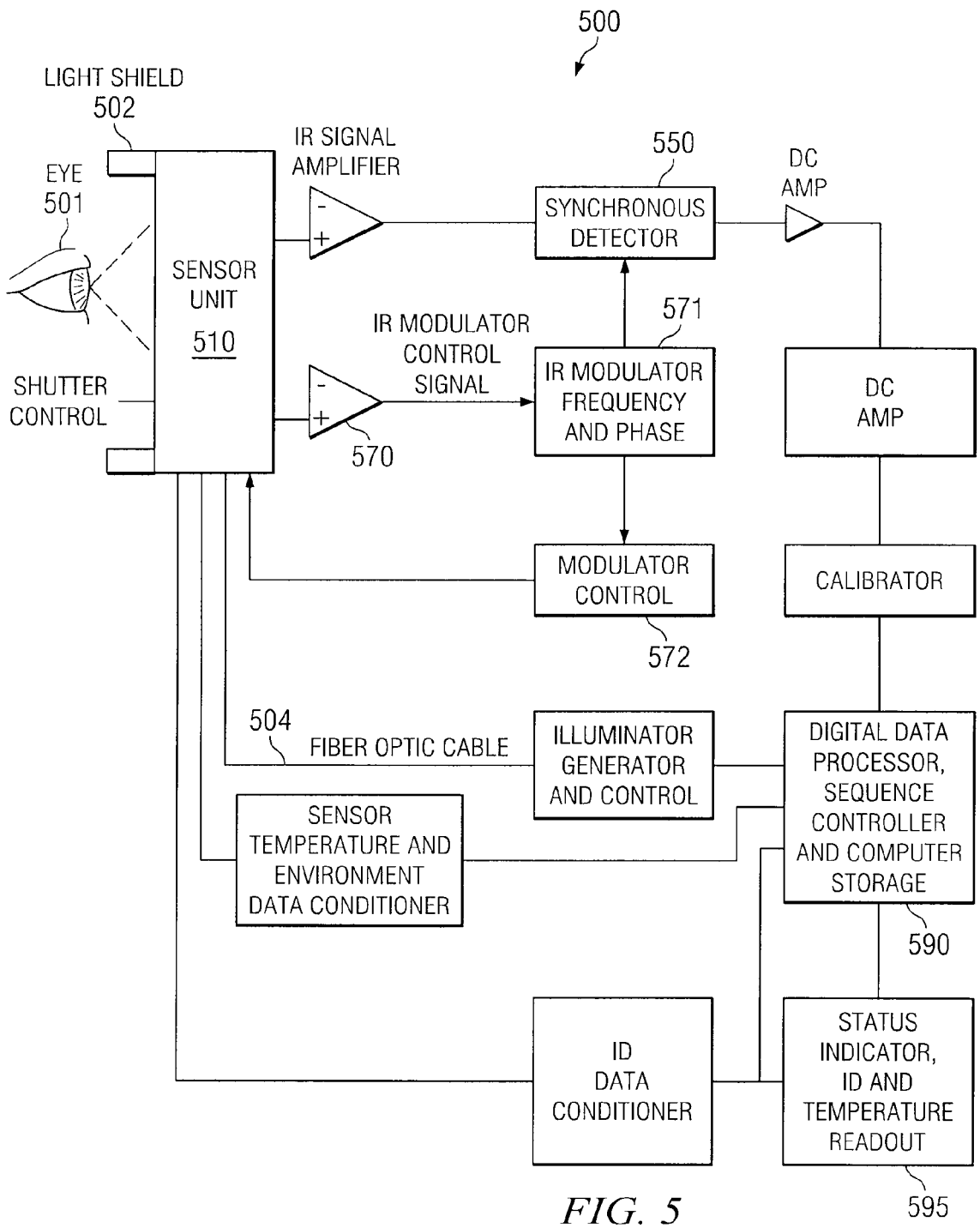
FIG. 5 is a block diagram of a second embodiment of the invention.

FIG. 5 is an improved embodiment of the invention, a temperature measurement device 500 for accurately and rapidly measuring core temperature. Device 500 is based on the use of internal eye emissions in the preferred spectral wavelength bands of 1600-1800 and/or 2150-2350 nm.

Figure 6:
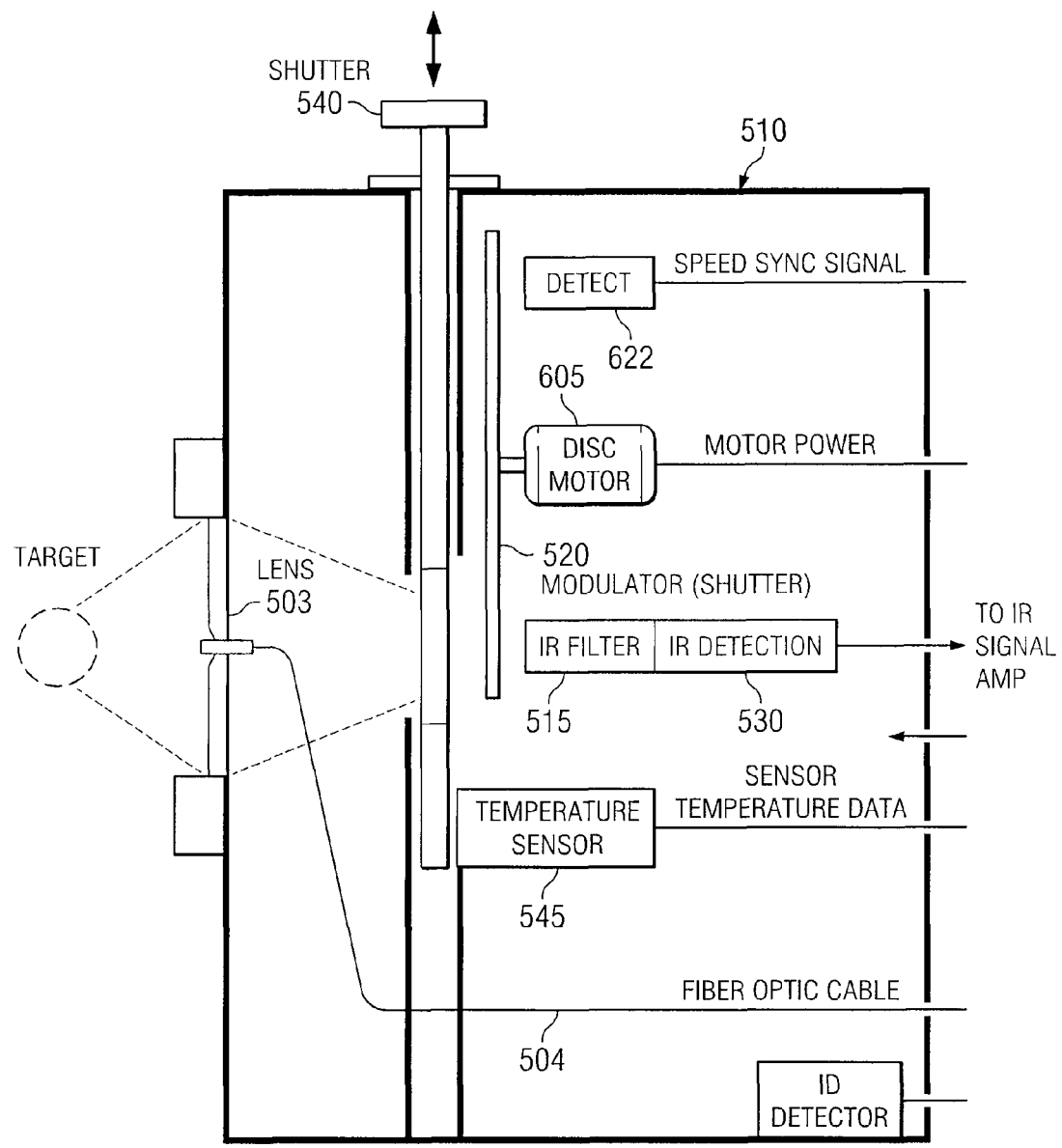
FIG. 6 shows details of the sensor assembly of FIG. 5.

FIG. 6 illustrates the sensor assembly 510 of FIG. 5 in further detail. An IR modulator 520 provides amplitude modulation of the IR signal received by the IR detector 530 at a selected frequency generally in the range of 200 to 500 Hz. The output signal from the detector 530 has an AC component of the modulation frequency of amplitude proportional to the detected IR signal from the eye. This permits the use of more stable AC signal amplification and permits the use of synchronous detection for improved sensitivity in detecting low intensity emissions. The modulator 520 may be implemented as a thin, dull black (emissivity ~=1.00), opaque disc with slots or line of holes about a selected radius that is rotated at constant speed by a small motor 605. As the disc rotates the line of slots or holes alternately blocks or passes the IR emissions coming from the eye to the IR detector. The modulated input is also used by photo sensor 522 to optically generate a sync signal synchronized with the speed of motor 605 for use in accurately controlling the motor speed. This is performed using an amplifier 570, frequency and phase unit 571, and controller 572. Alternate means for implementing modulator 5200 may be used, such as vibrating elements such as a tuning fork tine, vibrating mirrors, optical switches, and others.

Referring to both FIGS. 5 and 6, sensor 500 also has a light shield 502, a rubber eyepiece to minimize any spurious light or IR from entering the eye sensing aperture 501. Lens 503 focuses the sensitive spot on the eye onto the IR detector 530. Light shutter 540 is normally closed but is opened manually or electromechanically, to pass IR emissions from the eye to the detector during eye temperature measurements. Bandpass filter 515 passes IR emissions of selected wavelengths from the eye to the detector 530. A precision digital temperature sensor 545 measures the temperature immediately adjacent to the shutter 540 prior to and during eye temperature measurements. An optical fiber 504 conducts visible blue light from a pulsed LED source located outside sensory assembly 510 (to minimize heating of sensor assembly 510) to the center of the lens 503. The open end of the optical fiber 504 protrudes through and is anchored to the center of the lens 503. This provides a low level light target for a person being tested as to where his eye needs to be focused for consistent measurements. For animals, this light tends to attract their attention and help hold the eye in the proper orientation for consistent measurements. This light should be of low level and low duty cycle to minimize any heating errors that could cause measurement errors and also must be of a wavelength that does not pass through the IR filter. To minimize the rate of temperature change in sensor assembly 510, it should be thermally isolated from the remainder of the instrument 500 to minimize the rate and magnitude of internal temperature changes from the environment and instrument power consumption.

Determining eye temperature using the embodiment of FIG. 5 is based on measuring and summing two components. The first component is the IR temperature based on the amplitude of the electrical voltage produced by the detected IR eye emissions as amplified by the electronic instrumentation. Synchronous detector 550 demodulates the signal using synchronous demodulation techniques. The IR signal voltage is corrected for any instrument zero offset as well as for any IR signal component that can arise from unequal IR modulator and shutter temperatures. The input signal is then converted to an equivalent IR temperature in the data processor 590 using a digitized calibration curve based on Planck's Law for the operating wavelengths and bandwidths and the instrument gain and calibration factors. The temperature from the corrected IR signal channel is then added to the temperature as measured by the shutter temperature sensor 545 to obtain the displayed or stored eye temperature. The temperature can be displayed in degrees F. or degrees C.

Shutter 540 may be closed for determining temperature from sensor 545, and then opened during acquisition of the measurement temperature from the eye. Processor 590 may be programmed to perform sequence controller functions for automatically operating shutter 540, or shutter 540 may be operated manually.

In a slightly different embodiment of FIG. 5, the modulator 520 operates at a near constant speed or rate, but to save on cost and weight of the device, no speed regulator and no synchronous detection are used. Various digital signal processing techniques may be used to recover the weak modulated IR signal in noise. This approach does not require as much hardware to implement, and would be more reliable.

Figure 7A:
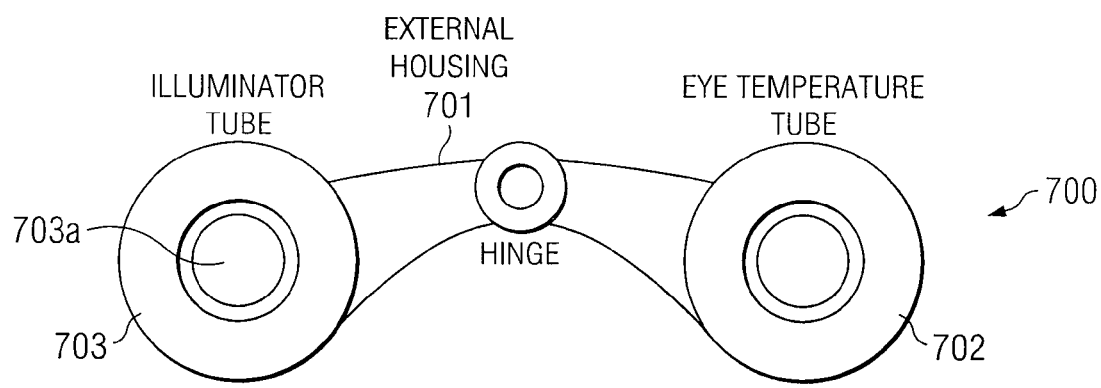
FIGS. 7A and 7B illustrate a dual eyepiece embodiment.
Figure 7B:
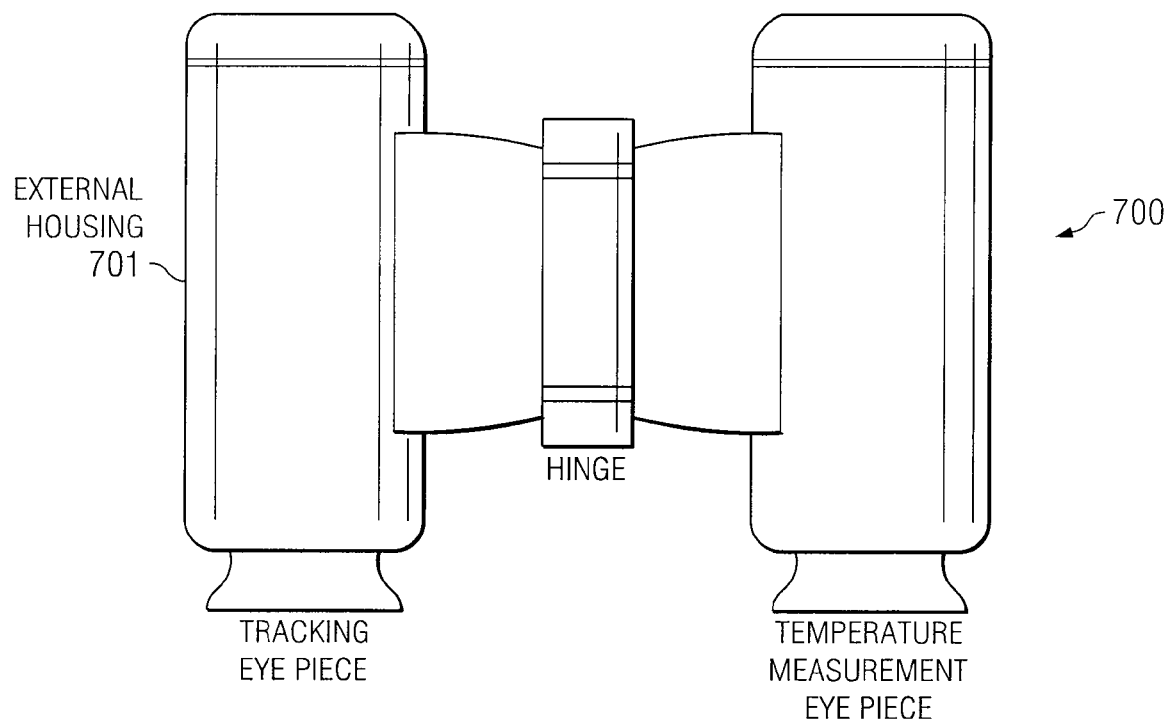

FIGS. 7A and 7B illustrate a "binocular" version of the invention, a dual eye piece temperature sensing device 700. The external housing 701 is similar to that of an optical binocular. A first tube 702 contains at least the IR sensing assembly 510. A second tube 703 contains a small light 703a on the center line that the user sees when the assembly is placed in front of his two eyes. Additional components, such as power supply batteries, electronic circuitry, data processing devices, and display elements may be placed in either tube as is practicable.

Because the eye muscles move both eyes together, when one eye is focused at the target light, the other will be directed towards the center of the IR sensor provided the two halves are adjusted to be the same distance apart as the person's eyes. Typical optical binoculars are mechanically arranged to permit this distance to be easily changed from person to person and are easily manipulated to match the eye spacing criteria. A person can readily position and use such a configuration to take his own temperature. Device 700 is easily hand held, and provides space for larger batteries and eases other size constraints.

Figure 8:
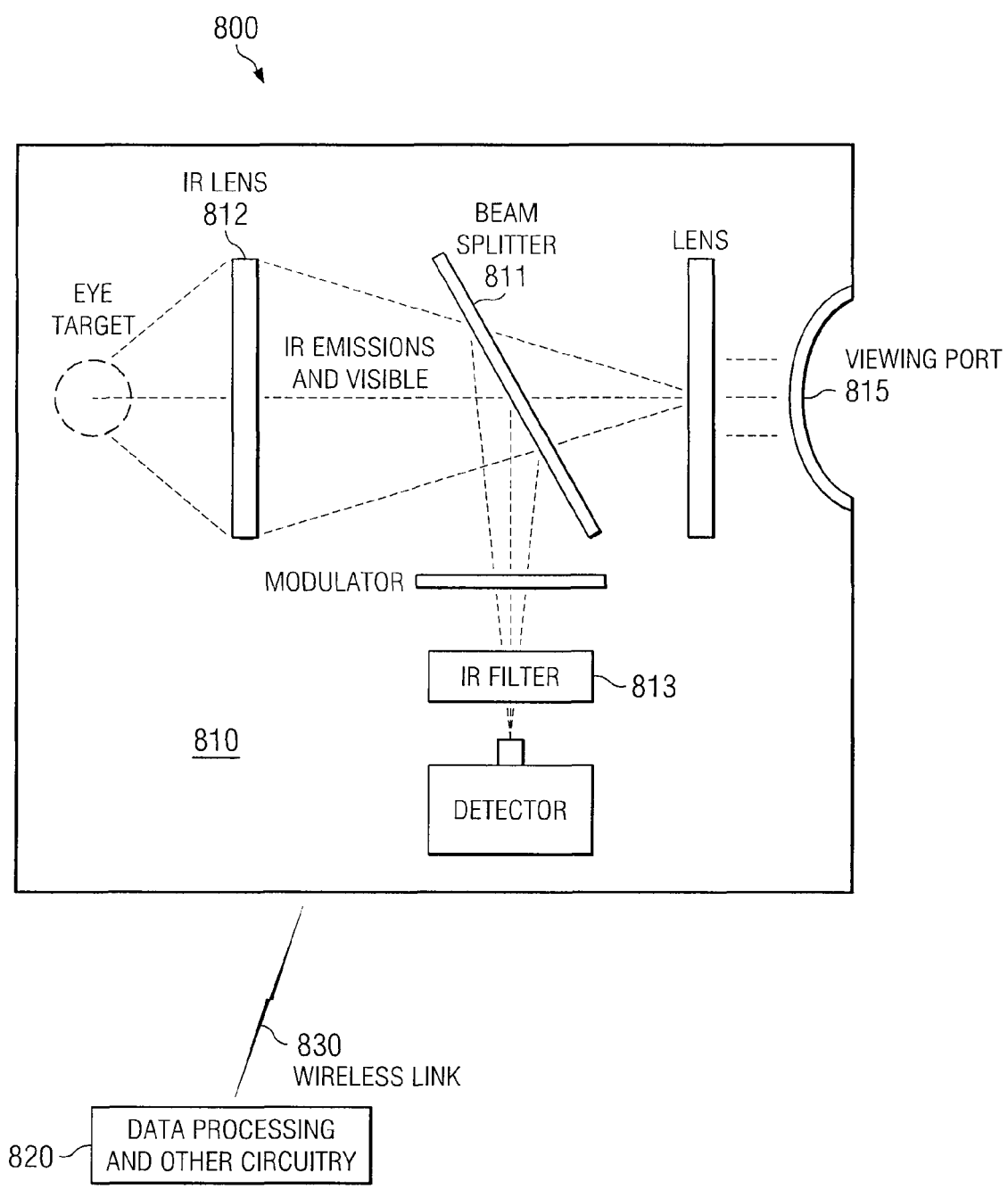
FIG. 8 illustrates an attachable embodiment of the invention.

FIG. 8 illustrates another embodiment, an attachable eye thermometer 800 for core temperature measurements, which is particularly useful for situations where a more compact instrument is desirable and particularly for use in temperature monitoring of patients that may be in surgery or confined to the bed. It would also be useful for attaching to an animal, or person, with a strap to hold the instrument in place over an eye. The above-described embodiments have been mostly intended for hand held measurements of temperature, and are well suited for this use, but the shape and length are less practical for attaching the device to a patient for monitoring over long periods. Device 800 is compact and may be relatively thin and is intended to fit over the eye region. An elastic material may be used to seal the periphery between the skin and the surface of the device 800 for fit and comfort as well as a barrier to external light which could cause errors. The change in configuration to achieve this embodiment is to bend the optical path of the IR emissions within the instrument and to possibly modify the overall instrument to have only the sensor assembly 810 in the attachable device. The sensor 810 communicates with the remainder of the instrument 820 over a wireless data link 830 or over a small cable and would be powered by an internal battery or over the data link cable. This embodiment bends the IR path by addition of a thin film optical beam splitter 811 between the lens 812 and the IR filter 813. This will reflect IR, of the critical wavelengths, at 90 degrees (+−) and allow the thickness of the package to be greatly reduced. In addition, by using a beam splitter that is transparent to visible light, it allows an optical viewing port 815 to be made available for viewing the eye through the beam splitter 811 and the lens 812. The optical port 815 can be optimized with additional optical components. The port 815 also is advantageous in allowing the operator or installer to properly align the sensor unit 810 with the desired region of the eye. In the embodiment of FIG. 8, the sensor unit 810 is like that of FIGS. 5 and 6, but could alternatively be implemented with other of the various configurations described above.

Although various embodiments of the invention are described herein, the scope of this invention is not limited to these embodiments nor do alternative embodiments need to include all the features described in FIG. 2. Other implementations could well be within the scope of this invention.

What is claimed is:

1. A device for measuring the core temperature of a subject animal or human, based on thermal emissions from the subject's eye, comprising:

a sensor unit having at least an optical modulator, a detector and a temperature sensor;

wherein the sensor unit is contained within a housing configured to provide thermal isolation of its internal elements;

a lens for receiving the thermal emissions from the subject's eye and directing the thermal emissions to the sensor unit via an aperture;

a shutter between the lens and the sensor unit, normally in a closed position such that it blocks the aperture and operable to open while the thermal emissions are being measured;

the optical modulator operable to modulate the amount of the thermal emissions that reach the detector while the thermal emissions are being measured;

the detector operable to detect only selected wavelengths of thermal emissions from the eyeball of the subject and to generate a signal corresponding to the emissions;

the temperature sensor operable to measure temperature inside the sensor unit proximate the aperture;

wherein the sensor unit is non contacting to the eyeball;

a data processing unit for converting the signal to raw temperature data and for determining core temperature data based on the raw temperature data and based on temperature data provided by the thermometer; and a display for displaying the core temperature data.

2. A device for measuring the core temperature of a subject animal or human, based on thermal emissions from the subject's eye, comprising:

a sensor unit having at least a lens and a detector, the lens operable to focus the thermal emissions onto the detector, such that the lens and detector form a thermal emissions input path of thermal emissions from the lens to the detector;

the detector operable to detect the selected wavelengths of thermal emissions from the eyeball of the subject and to generate a signal corresponding to the emissions;

wherein the sensor unit is non-contacting to the eyeball;

an optical cable for delivering visible light to the lens via an open terminal end of the optical cable through the lens;

a light source for providing the visible light into the optical cable;

wherein the light source is thermally isolated from the detector;

wherein the optical cable forms a light path separate from the thermal emissions input path;

an amplifier unit for amplifying the signal from the sensor unit and for generating an amplified signal;

a data processing unit for converting the amplified signal to raw temperature data and for determining core temperature data derived from the raw temperature data; and a display for displaying the core temperature data.

3. The device of claim 1, wherein the selected wavelengths are emitted from a particular depth within the eyeball.

4. The device of claim 1, wherein the sensor unit detects only near infrared emissions.

5. The device of claim 1, wherein the sensor unit detects millimeter wavelength emissions.

6. The device of claim 1, wherein the sensor unit detects micrometer wavelength emissions.

7. The device of claim 1, wherein the sensor unit detects more than one wavelength band.

8. The device of claim 1, wherein the modulator is a motor-operated disk with openings for transmitting the emissions to the detector, and wherein the device further comprises a motor for rotating the disk.

9. The device of claim 8, further comprising a synchronization unit for receiving the modulated signal and for using the modulated signal to control the speed of the motor.

10. The device of claim 1, further comprising a light shield for shielding the sensor unit from thermal emissions unrelated to emissions from the eye.

11. The device of claim 1, further comprising an illumination marker operable to emit a beam of visible light corresponding to a receiving area of the sensor unit.

12. The device of claim 11, wherein the illumination marker is an optic fiber at the lens.

13. The device of claim 2, wherein the selected wavelengths are emitted from a particular depth within the eyeball.

14. The device of claim 2, wherein the sensor unit detects only near infrared emissions.

15. The device of claim 2, wherein the sensor unit detects millimeter wavelength emissions.

16. The device of claim 2, wherein the sensor unit detects micrometer wavelength emissions.

17. The device of claim 2, wherein the sensor unit detects more than one wavelength band.

18. The device of claim 2, further comprising a modulator operable to modulate the amplitude of the thermal emissions that reach the detector.

19. The device of claim 18, wherein the modulator is a motor-operated disk with openings for transmitting the emissions to the detector, and wherein the device further comprises a motor for rotating the disk.

20. The device of claim 19, further comprising a synchronization unit for receiving the modulated signal and for using the modulated signal to control the speed of the motor.

21. The device of claim 2, further comprising a thermometer for measuring ambient temperature proximate the device.

22. The device of claim 2, further comprising a light shield for shielding the sensor unit from thermal emissions unrelated to emissions from the eye.

23. The device of claim 2, further comprising a shutter between the lens and the detector, operable between an open and a closed position, such that it blocks thermal emissions to the detector when closed.

24. A method of measuring core temperature of a subject animal or human, comprising the steps of:

using a non-contact sensor unit for non-contact sensing of thermal emissions only from the eye of the subject, by using a filter to filter thermal emissions from the eyeball of the subject, such that only selected wavelengths pass through the filter and by using a detector to detect the filtered thermal emissions;

using an optical modulator to modulate the amplitude of the thermal emissions that reach the sensor unit;

generating an electrical signal corresponding to the intensity of the emissions;

receiving the electrical signal at a data processing unit;

converting the electrical signal to core temperature data;

displaying the core temperature of the subject data on a display readout;

wherein the sensor unit is contained within a housing having an aperture for receiving the thermal emissions into the housing;

using a shutter at the aperture to block electromagnetic radiation from reaching the detector except when thermal emissions are being measured;

using a temperature sensor located in the housing proximate the aperture to obtain reference temperature data; and deriving a core temperature measurement based on the core temperature data and the reference temperature data.

25. The method of claim 24, further comprising the step of detecting identification data associated with the subject.

26. The device of claim 1, wherein at least the sensor unit, lens, and shutter are housed in a binocular type housing.

27. The device of claim 2, wherein at least the sensor unit, optical cable, and light source are housed in a binocular type housing.

* * * * *